United States Patent [19]

Marcel et al.

[11] Patent Number: 5,357,588
[45] Date of Patent: Oct. 18, 1994

[54] OPTO-ELECTRONIC TRANSDUCER DEVICE FOR OPTICAL LINK TERMINATION EQUIPMENT AND APPLICATION THEREOF TO VARIOUS TYPES OF OPTICAL LINK

[75] Inventors: Francois Marcel, Orsay, France; Charles Eldering, Madrid, Spain; Serge Allaire, Beaumont-le-Roger, France

[73] Assignee: Alcatel Cit, Paris, France

[21] Appl. No.: 52,758

[22] Filed: Apr. 27, 1993

[30] Foreign Application Priority Data

Apr. 29, 1992 [FR] France ............... 92 05299

[51] Int. Cl.$^5$ ............................................. G02B 6/26
[52] U.S. Cl. .......................................... 385/16; 385/24
[58] Field of Search ............... 385/14, 16, 17, 20, 385/21, 22, 23, 24, 15, 44, 45, 46, 89

[56] References Cited

U.S. PATENT DOCUMENTS 5,016,966  5/1991  Bowen et al. ............... 350/96.19
5,208,879  5/1993  Gallo et al. ................. 385/14

FOREIGN PATENT DOCUMENTS 0187198   7/1986  European Pat. Off. .
1-37524A  2/1989  Japan ........................... 385/16
4-3550A   1/1992  Japan ........................... 385/16
WO9107677 5/1991  World Int. Prop. O. .

OTHER PUBLICATIONS

Laser Focus, vol. 22, No. 4, Apr. 1986, Littleton, US, pp. 98–108, Roberts et al: "WDM active coupler facilitates bidirectional transmission".

Primary Examiner—Rodney B. Bovernick
Assistant Examiner—John Ngo
Attorney, Agent, or Firm—Sughrue, Mion, Zinn, Macpeak & Seas

[57] ABSTRACT

This device essentially comprises:
  first and second connection ports (R1, R2) for said optical link,
  first, second and fourth supports (S1, S2, S4) adapted to support first, second and third opto-electronic transducer means, respectively, and
  third and fifth supports (S3, S5) adapted to support first and second beam switching means, respectively, these components being located in a common structure (S) and disposed relative to each other to enable optical transmission between said first connection port R1 and said first beam switching means, between each of said first and second opto-electronic transducer means and said first beam switching means, between said second port R2 and said second beam switching means, between each of the two switching means and between said third opto-electronic transducer means and said second switching means, so defining within said structure first, second, third, fourth, fifth, sixth and seventh optical transmission channels (V1, V2, V3, V4, V5, V6, V7).

15 Claims, 5 Drawing Sheets

5,357,588

OPTO-ELECTRONIC TRANSDUCER DEVICE FOR OPTICAL LINK TERMINATION EQUIPMENT AND APPLICATION THEREOF TO VARIOUS TYPES OF OPTICAL LINK

BACKGROUND OF THE INVENTION

1. Field of the Invention

The present invention is generally concerned with optical transmission. It is more particularly concerned with an opto-electronic transducer device for optical link termination equipment. Said termination equipment may be at the end of the link or in-line equipment (such as a regenerator or repeater) along the link.

2. Description of Related Art

The interfaces provided in optical link termination equipment to contain the send opto-electronic transducer means for converting electrical signals into optical signals and the receive opto-electronic transducer means for converting optical signals into electrical signals, which is necessary to enable transmission of data on this type of link, currently comprise for each application, i.e. for each type of link (for example, in the case of a bidirectional optical link, for a link of the type comprising a single bidirectional transmission medium or two unidirectional transmission media) a specific opto-electronic transducer device appropriate to the application concerned.

SUMMARY OF THE INVENTION

One object of the present invention is an opto-electronic transducer device which can be used in a large number of applications and which consequently renders the design and the implementation of these interfaces more economical.

Thus the present invention consists in an opto-electronic transducer device for optical link termination equipment comprising, in a first embodiment of the invention:

a first connection port for said optical link, first and second supports adapted to support respective first and second opto-electronic transducer means, and a third support adapted to support first beam switching means, these components being located in a common structure and disposed relative to each other so as to enable optical transmission between said first connection port and said first beam switching means and between each of said opto-electronic transducer means and said first beam switching means, so defining within said structure respective first, second and third optical transmission channels, characterized in that it further comprises in this first embodiment of the invention a second connection port for said optical link and a fourth support adapted to support third opto-electronic transducer means, these latter two components being also located in said structure and disposed relative to each other and relative to the previous components to enable optical transmission between said third opto-electronic transducer means and said second connection port, so defining within said structure a fourth optical transmission channel.

The present invention also consists in an opto-electronic transducer device for optical link termination equipment comprising, in a second embodiment of the invention:

a first connection port for said optical link, first and second supports adapted to support respective first and second opto-electronic transducer means, and a third support adapted to support first beam switching means, these components being located in a common structure and disposed relative to each other so as to enable optical transmission between said first connection port and said first beam switching means and between each of said opto-electronic transducer means and said first beam switching means, so defining within said structure respective first, second and third optical transmission channels, characterized in that it further comprises in this second embodiment of the invention a second connection port for said optical link and a fifth support adapted to support second beam switching means, these latter two components being also located in said structure and disposed relative to each other and relative to the previous components to enable optical transmission between said second beam switching means and said second connection port and between said second beam switching means and said first beam switching means, so defining within said structure fifth and sixth optical transmission channels.

In a third embodiment of the invention this device further comprises, relative to that of said second embodiment, a fourth support adapted to support third opto-electronic transducer means also located in said structure and disposed relative to the components respective to said second embodiment to enable optical transmission between said second beam switching means and said third opto-electronic transducer means, so defining within said structure a seventh optical transmission channel.

Another object of the present invention is the application of the above devices to various types of optical link.

BRIEF DESCRIPTION OF THE DRAWINGS

Other objects and features of the present invention will emerge from the following description of embodiments of the invention given with reference to the appended drawings in which.

DESCRIPTION OF THE PREFERRED EMBODIMENTS

Figure 1:
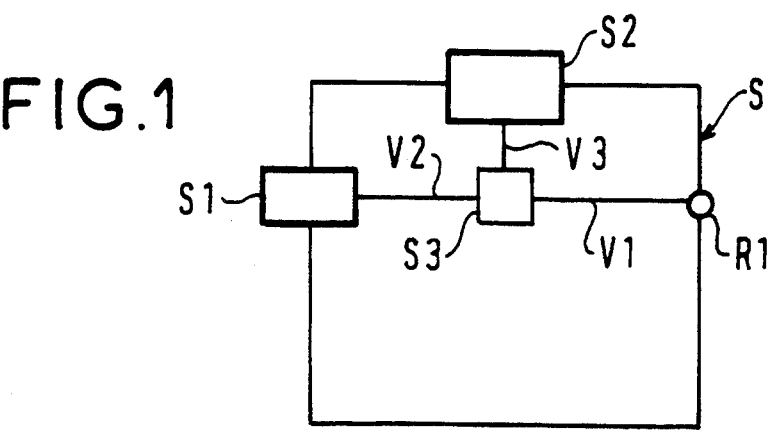
FIG. 1 is a block diagram of an opto-electronic transducer device for optical link termination equipment intended to facilitate the description of the various embodiments of the present invention, FIGS. 2, 3 and 4 respectively show first, second and third embodiments of an opto-electronic transducer device in accordance with the invention.

The opto-electronic transducer device shown in FIG. 1 comprises:
- a first connection port R1 for said optical link,
- first and second supports S1, S2 adapted to support respective first and second opto-electronic transducer means, and
- a third support S3 adapted to support first beam switching means, these components being located in a common structure S and disposed relative to each other so as to enable optical transmission between said first connection port and said first beam switching means and between each of said opto-electronic transducer means and said first beam switching means, so defining within said structure S respective first, second and third optical transmission channels V1, V2, V3.

Figure 2:
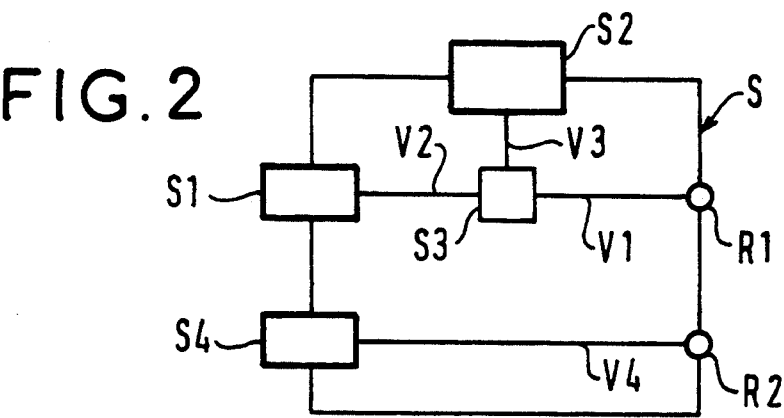

The opto-electronic transducer device shown in FIG. 2 further comprises a second connection port R2 for said optical link and a fourth support S4 adapted to support third opto-electronic transducer means, these latter two components being also located in said structure S and disposed relative to each other and relative to the components from the FIG. 1 block diagram to enable optical transmission between said third opto-electronic transducer means and said second connection port, so defining within said structure a fourth optical transmission channel V4.

Figure 3:
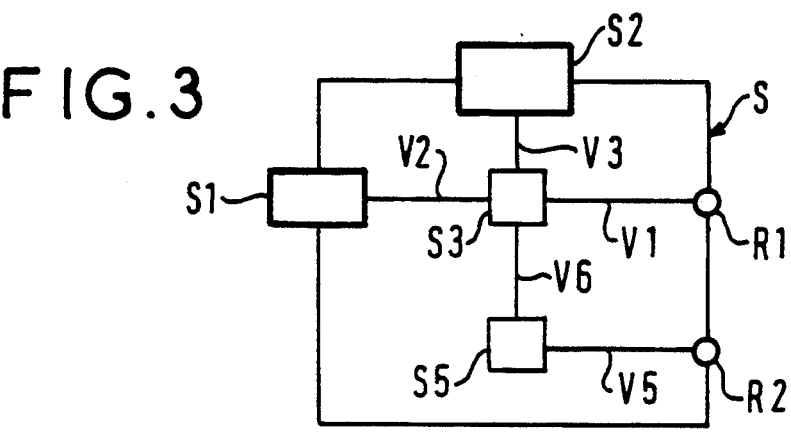

The opto-electronic transducer device shown in FIG. 3 further comprises, relative to that shown in FIG. 1, a second connection port R2 for said optical link and a fifth support S5 adapted to support second beam switching means, these latter two components being also located in said structure S and disposed relative to each other and relative to the components of the FIG. 1 block diagram to enable optical transmission between said second beam switching means and said second connection port and between said second beam switching means and said first beam switching means, so defining within said structure S fifth and sixth optical transmission channels V5, V6.

Figure 4:
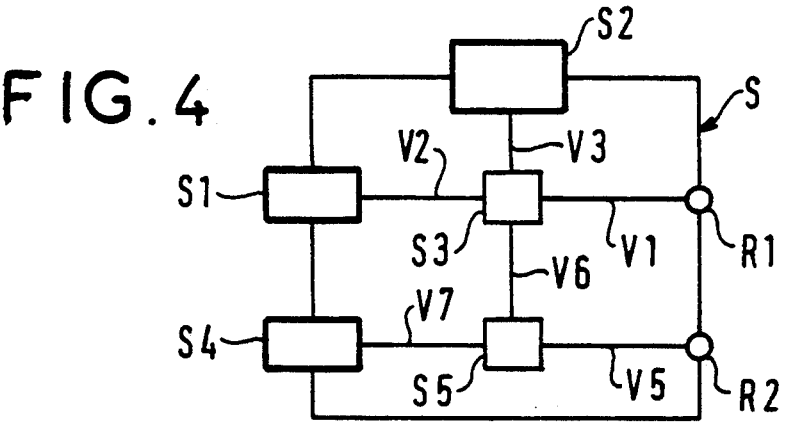

The opto-electronic transducer device shown in FIG. 4 further comprises, relative to that shown in FIG. 1:
- a second connection port R2 for said optical link,
- a fourth support S4 adapted to support third opto-electronic transducer means, and
- a fifth support S5 adapted to support second beam switching means, these other components being also located in said structure S and disposed relative to each other and relative to the components from the FIG. 1 block diagram to enable optical transmission between said second connection port and said second beam switching means, between said second beam switching means and said first beam switching means and between said second beam switching means and said third opto-electronic transducer means, so defining within said structure fifth, sixth and seventh optical transmission channels V5, V6, V7.

Said structure S may be a block of solid synthetic material, for example, shown in cross-section in FIGS. 1, 2, 3 and 4, in which cavities are provided at the location of the various supports and components adapted to be supported by these supports and at the location of the various transmission channels and connection ports.

Figure 5:
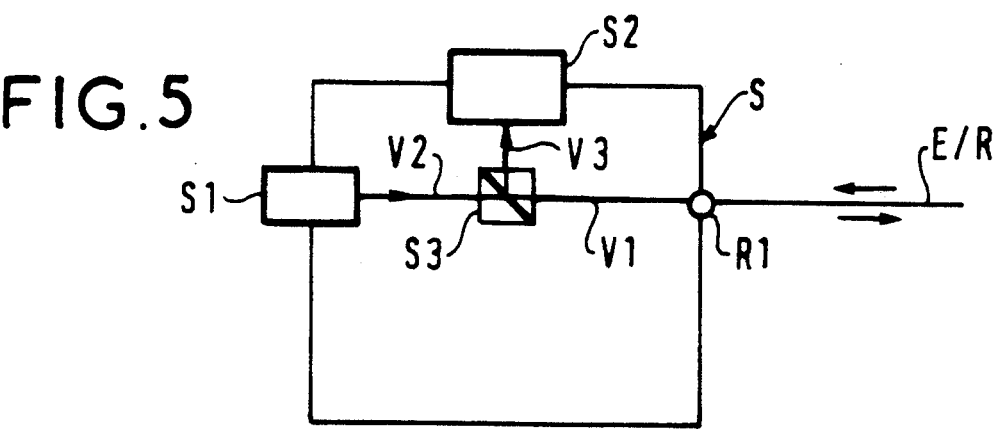
FIG. 5 shows the application of a device from FIG. 1 to termination equipment for a bidirectional optical link comprising a single bidirectional transmission medium, FIGS. 6, 7 and 8 respectively show the application of a device according to the first, second and third embodiments of the invention to termination equipment of a bidirectional optical link comprising a single bidirectional transmission medium, FIGS. 9 and 10 respectively show the application of a device according to the first and second embodiments of the invention to termination equipment of a bidirectional optical link comprising two unidirectional transmission media respectively assigned to sending and receiving.

FIG. 5 shows the application of a device of the type shown in FIG. 1 to termination equipment of a bidirectional optical link comprising a single bidirectional transmission medium E/R. In this application:
- said bidirectional transmission medium E/R is connected to said first connection port R1,
- said third support S3 supports beam switching means comprising send and receive beam splitter means, and
- said first and second supports S1, S2 respectively support send and receive opto-electronic transducer means or vice versa according to whether said send beam is conveyed by said second transmission channel and said receive beam is conveyed by said third transmission channel (which is the situation shown by way of example in this figure) or vice versa.

Figure 6:
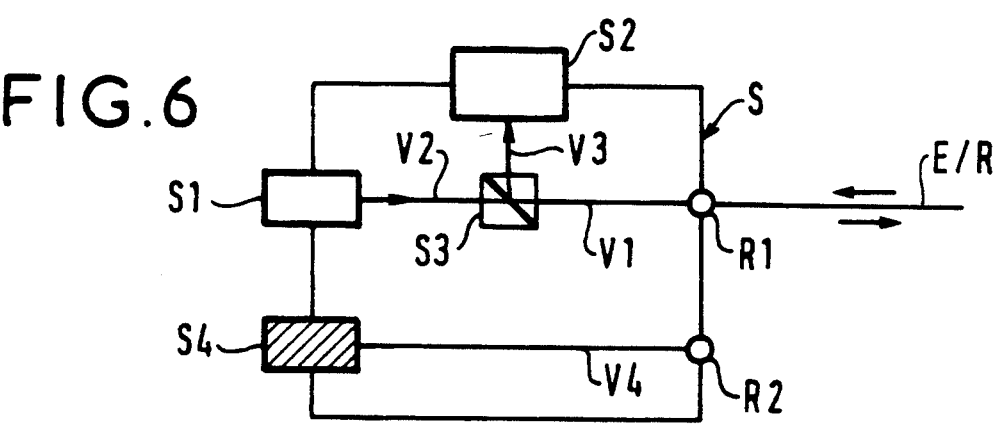

FIG. 6 shows the application of a device of the type shown in FIG. 2 to termination equipment of a bidirectional optical link comprising a single bidirectional transmission medium E/R. In this application:
- said bidirectional transmission medium E/R is connected to said first connection port R1,
- said third support S3 supports beam switching means comprising send and receive beam splitter means,
- said first and second supports S1, S2 respectively support send and receive opto-electronic transducer means or vice versa depending on whether said send beam is conveyed by said second transmission channel and said receive beam is conveyed by said third transmission channel (which is the situation shown by way of example in this figure) or vice versa, and
- said fourth support S4 does not support any component (symbolized by cross-hatching in the figure) and said second connection port R2 is not connected to any optical transmission medium.

Figure 7:
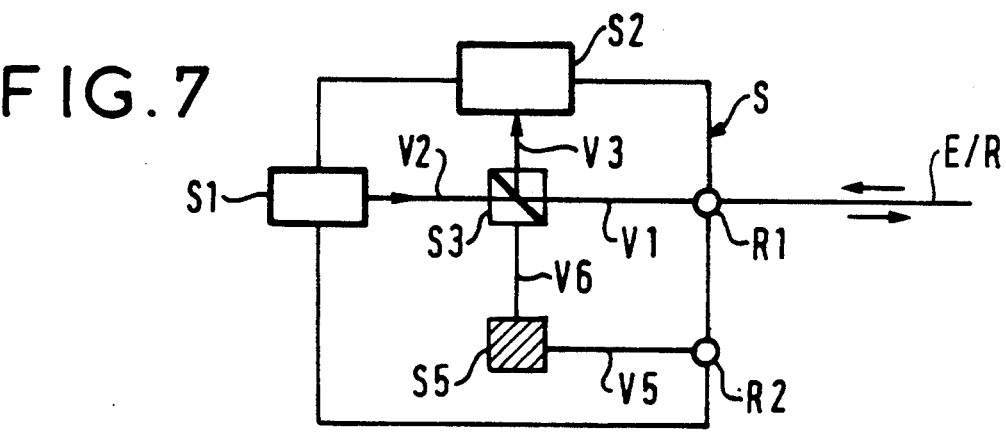

FIG. 7 shows the application of a device of the type shown in FIG. 3 to termination equipment of a bidirectional optical link comprising a single bidirectional transmission medium E/R. In this application:
- said bidirectional transmission medium E/R is connected to said first connection port R1,
- said third support S3 supports beam switching means comprising send and receive beam splitter means,
- said first and second supports S1, S2 respectively support send and receive opto-electronic transducer means or vice versa depending on whether said send beam is conveyed by said second transmission channel and said receive beam is conveyed by said third transmission channel (which is the situation shown by way of example in this figure) or vice versa, and said fifth support S5 does not support any component (symbolized by cross-hatching in the figure) and said second connection port R2 is not connected to any optical transmission medium.

Figure 8:
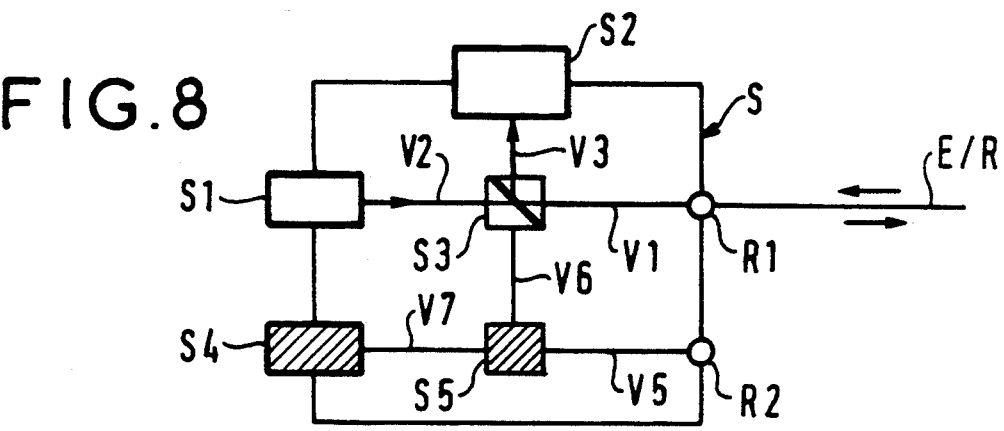

FIG. 8 shows the application of a device of the type shown in FIG. 4 to termination equipment of a bidirectional optical link comprising a single bidirectional transmission medium E/R. In this application:

said bidirectional transmission medium E/R is connected to said first connection port R1, said third support S3 supports beams switching means comprising send and receive beam splitter means, said first and second supports S1, S2 respectively support send and receive opto-electronic transducer means or vice versa depending on whether said send beam is conveyed by said second transmission channel and said receive beam is conveyed by said third transmission channel (which is the situation shown by way of example in this figure) or vice versa, and said fourth support S4 and said fifth support S5 do not support any component (symbolized by cross-hatching in the figure) and said second connection port R2 is not connected to any optical transmission medium.

Figure 9:
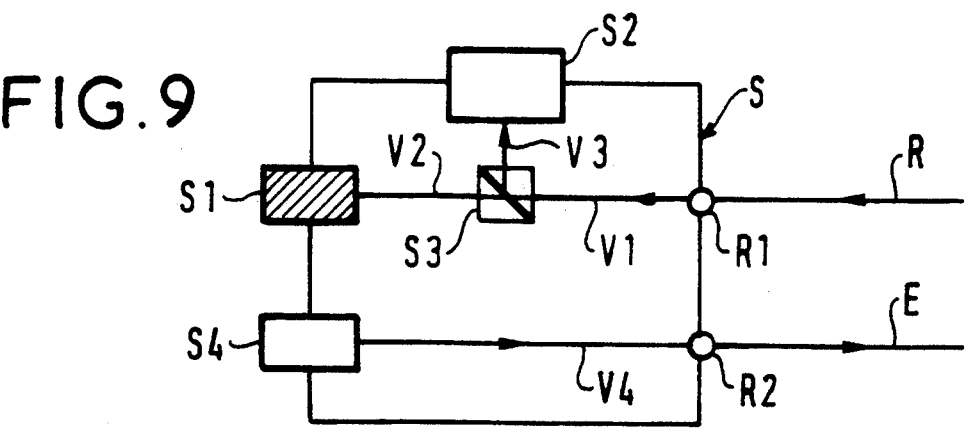

FIG. 9 shows the application of a device of the type shown in FIG. 2 to termination equipment of a bidirectional optical link comprising two unidirectional transmission media E, R respectively assigned to sending and receiving. In this application:

one of said unidirectional transmission media is connected to said first connection port R1 and the other to said second connection port R2, said third support S3 supports beam switching means comprising means for deflecting the beam from the first channel to the third channel or vice versa depending on whether said transmission medium R assigned to receiving is connected to the first connection port R1 and said transmission medium E assigned to sending is connected to the second connection port R2 (which is the situation shown by way of example in this figure) or vice versa, said fourth support S4 supports send or receive optoelectronic transducer means depending on whether said transmission medium E assigned to sending is connected to the second connection port R2 and said transmission medium R assigned to receiving is connected to the first connection port R1 (which is the situation shown by way of example in this figure) or vice versa, and said first or second support supports receive or send opto-electronic transducer means depending on whether said transmission medium R assigned to receiving is connected to the first connection port R1 and said transmission medium E assigned to sending is connected to the second connection port R2 (which is the situation shown by way of example in this figure) or vice versa, the other of said first and second supports then supporting no component (symbolized by cross-hatching in the figure).

Figure 10:
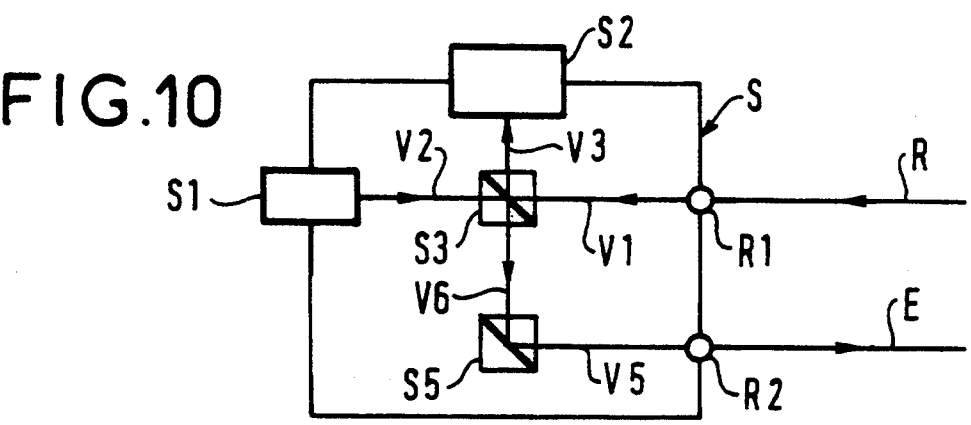

FIG. 10 shows the application of a device of the type shown in FIG. 3 to termination equipment of a bidirectional optical link comprising two unidirectional transmission media E, R respectively assigned to sending and receiving. In this application:

one of said unidirectional transmission media is connected to said first connection port R1 and the other to said second connection port R2, said third support S3 supports beam switching means comprising means for deflecting the beam from said first channel V1 to said third channel V3 or vice versa depending on whether the unidirectional transmission medium R assigned to receiving is connected to said first connection port R1 and said unidirectional medium assigned to sending is connected to said second connection port R2 (which is the situation shown by way of example in the figure) and from said second channel V2 to said sixth channel V6 or vice versa depending on whether said unidirectional transmission medium assigned to receiving is connected to said first connection port R1 and said unidirectional transmission medium assigned to sending is connected to said second connection port R2 (which is the situation shown by way of example in this figure) or vice versa, said fifth support S5 supports beam switching means comprising means for deflecting the beam from said sixth channel V6 to said fifth channel V5 or vice versa depending on whether said unidirectional transmission medium R assigned to receiving is connected to said first connection port and said unidirectional transmission medium E assigned to sending is connected to said second connection port R2 (which is the situation shown by way of example in this figure) or vice versa, and said first and second supports S1, S2 respectively support send and receive opto-electronic transducer means or vice versa depending on whether the transmission medium E assigned to sending is connected to the second connection port R2 and the transmission medium R assigned to receiving is connected to the first connection port R1 (which is the situation shown by way of example in this figure) or vice versa.

Figure 11:
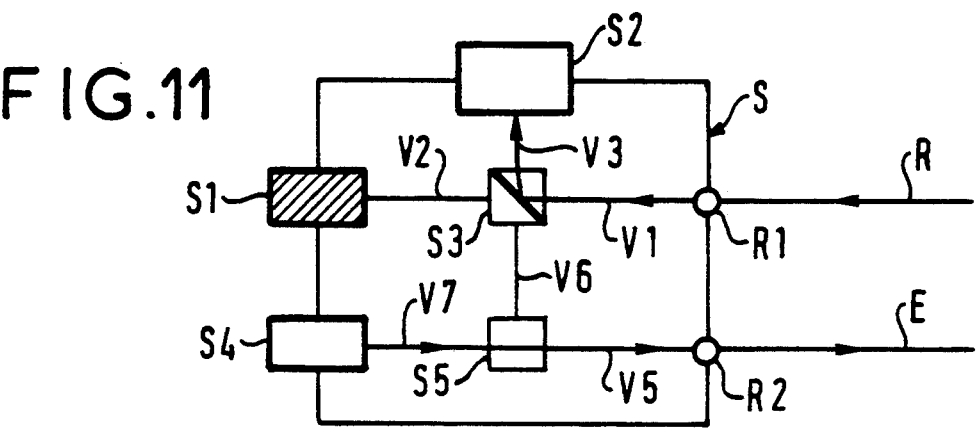
FIGS. 11 and 12 shows two possible applications of a device according to said third embodiment of the invention to termination equipment of a bidirectional optical link comprising two unidirectional transmission media respectively assigned to sending and receiving, FIGS. 13 and 14 respectively show the application of a device according to the first and third embodiments of the invention to termination equipment for an optical link comprising one bidirectional transmission medium and one unidirectional transmission medium.

FIG. 11 shows a first application of a device of the type shown in FIG. 4 to termination equipment of a bidirectional optical link comprising two unidirectional transmission media E, R respectively assigned to sending and receiving. In this application:

one of said unidirectional transmission media E, R is connected to said first connection port R1 and the other to said second connection port R2, said third support S3 supports beam switching means comprising means for deflecting the beam from the first channel V1 to the third channel V3 or vice versa depending on whether said transmission medium R assigned to receiving is connected to said first connection port R1 and said transmission medium E assigned to sending is connected to said second connection port R2 (which is the situation shown by way of example in this figure) or vice versa, said fourth support S4 supports send or receive optoelectronic transducer means depending on whether said transmission medium E assigned to sending is connected to the second connection port R2 and said transmission medium R assigned to receiving is connected to said first connection port R1 (which is the situation shown by way of example in this figure) or vice versa, one of said first and second supports supports receive or send opto-electronic transducer means depending on whether said transmission medium R assigned to receiving is connected to the first connection port R1 and said transmission medium E assigned to sending is connected to the second connection port R2 (which is the situation shown by way of example in this figure) or vice versa, the other of said first and second supports then not supporting any component, and said fifth support does not support any component and enables said fifth and seventh channels to be connected together, as shown symbolically in the figure.

Figure 12:
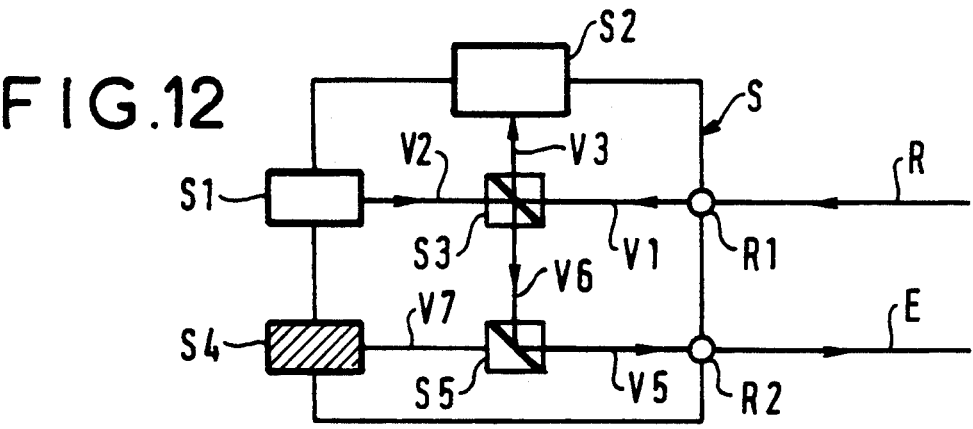

FIG. 12 shows a second application of a device of the type shown in FIG. 4 to termination equipment of a bidirectional optical link comprising two unidirectional transmission media E, R respectively assigned to sending and receiving. In this application:

one of said unidirectional transmission media E, R is connected to said first connection port R1 and the other to said second connection port R2, said third support S3 supports beam switching means comprising means for deflecting the beam from said first channel V1 to said third channel V3 or vice versa depending on whether said unidirectional transmission medium assigned to receiving is connected to said first connection port and said transmission medium assigned to sending is connected to said second connection port (which is the situation shown by way of example in this figure) or vice versa and from said second channel to said sixth channel or vice versa depending on whether said unidirectional transmission medium assigned to receiving is connected to said first connection port and said transmission medium assigned to sending is connected to said second connection port (which is the situation shown by way of example in this figure) or vice versa, said fifth support S5 supports beam switching means comprising means for deflecting the beam from said sixth channel to said fifth channel or vice versa depending on whether said unidirectional transmission medium assigned to receiving is connected to said first connection port and said unidirectional transmission medium assigned to sending is connected to said second connection port (which is the situation shown by way of example in this figure) or vice versa, said first and second supports S1, S2 respectively support send and receive opto-electronic transducer means or vice versa depending on whether the transmission medium assigned to receiving is connected to the first connection port and the transmission medium assigned to sending is connected to the second connection port (which is the situation shown by way of example in this figure) or vice versa, and said fourth support S4 does not support any component which is symbolized by the cross-hatching in the figure.

Figure 13:
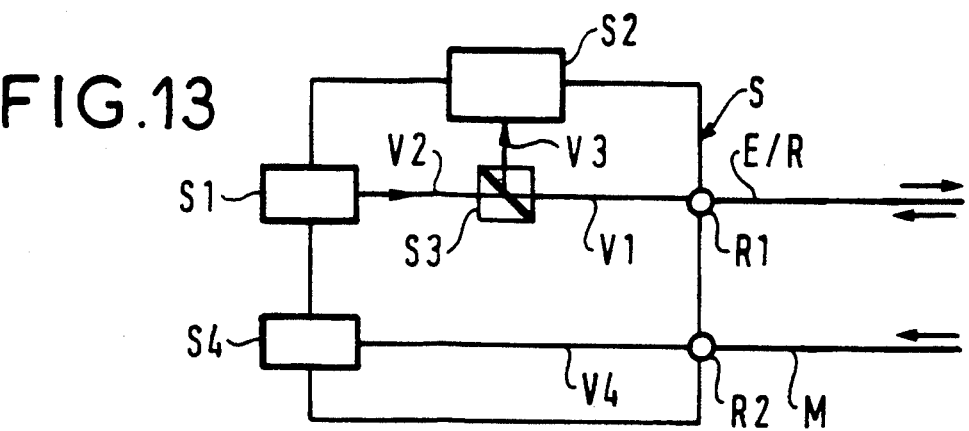

FIG. 13 shows the application of a device of the type shown in FIG. 2 to termination equipment of an optical link comprising a bidirectional optical transmission medium E/R and a unidirectional transmission medium M. In this application:

said bidirectional optical transmission medium E/R is connected to the first connection port R1, said unidirectional optical transmission medium M is connected to the second connection port R2, said third support S3 supports beam switching means comprising send and receive beam splitter means, said first and second supports S1, S2 respectively support send and receive opto-electronic transducer means or vice versa depending on whether said send beam is conveyed by said second transmission channel and said receive beam is conveyed by said third transmission channel or vice versa, and said fourth support S4 supports send or receive opto-electronic transducer means depending on whether said termination equipment is a send or receive termination equipment for said unidirectional optical transmission medium M (this is the situation shown by way of example in this figure).

Figure 14:
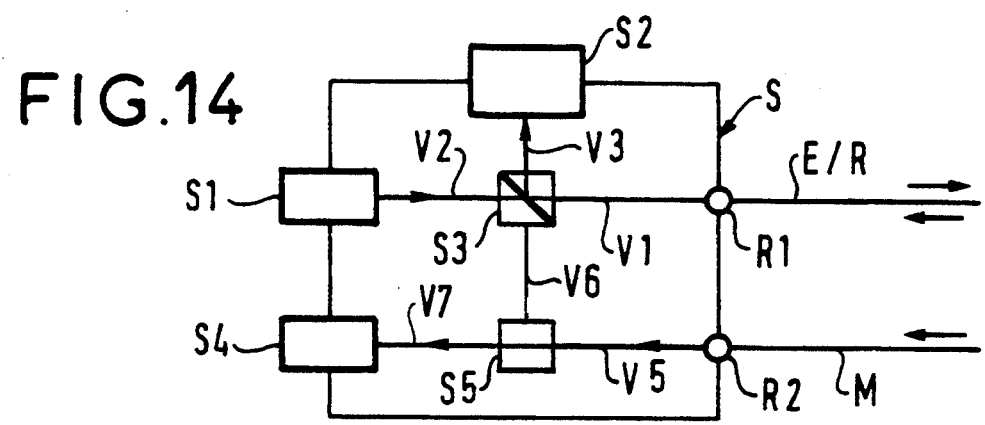

FIG. 14 shows the application of a device of the type shown in FIG. 4 to termination equipment of an optical link comprising a bidirectional optical transmission medium E/R and a unidirectional optical transmission medium M. In this application:

said bidirectional optical transmission medium E/R is connected to the first connection port R1, said unidirectional optical transmission medium M is connected to the second connection port R2, said third support S3 supports beam switching means comprising send and receive beam splitter means, said first and second supports S1, S2 respectively support send and receive opto-electronic transducer means or vice versa depending on whether said send beam is conveyed by said second transmission channel and said receive beam is conveyed by said third transmission channel or vice versa, said fourth support S4 supports send or receive opto-electronic transducer means depending on whether the termination equipment is a send or receive termination equipment for said unidirectional transmission medium M (which is the situation shown by way of example in this figure), and said fifth support S5 does not support any component and enables said fifth and seventh channels to be connected together, as symbolically represented in the figure.

Figure 15:
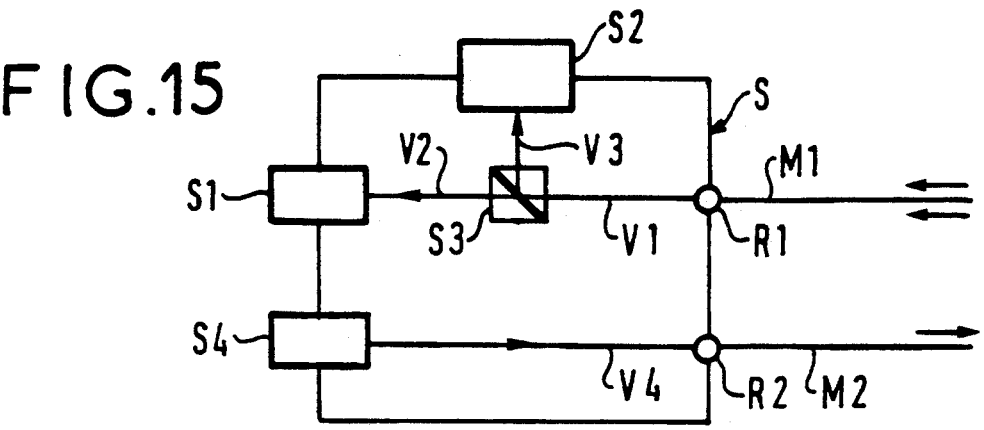
FIG. 15 shows the application of a device according to the first embodiment of the invention to termination equipment of an optical link comprising two unidirectional transmission media one of which is a wavelength division multiplexed unidirectional transmission medium, FIGS. 16 and 17 respectively show two applications of a device according to the third embodiment of the invention to termination equipment of an optical link comprising two unidirectional transmission media one of which is a wavelength division multiplexed unidirectional transmission medium.

FIG. 15 shows the application of a device of the type shown in FIG. 2 to termination equipment of an optical link comprising two unidirectional optical transmission media M1, M2 of which one (M1) is a wavelength division multiplexed unidirectional transmission medium. In this application:

said wavelength division multiplexed unidirectional transmission medium M1 is connected to said first connection port R1 and the other unidirectional transmission medium is connected to said second connection port R2, said third support S3 supports beam switching means comprising means for splitting beams according to their wavelength from said first channel to said third channel and from said first channel to said second channel or vice versa depending on whether said unidirectional transmission medium assigned to receiving is connected to said first connection port and said unidirectional medium assigned to sending is connected to said second connection port (which is the situation shown by way of example in this figure) or vice versa; in the latter case the beam switching means comprise beam combiner means, said first and second supports S1, S2 respectively support two send opto-electronic transducer means respectively operating at one of said wavelengths or two receive opto-electronic transducer means respectively operating at one of said wavelengths depending on whether said termination equipment is a send or receive termination equipment for said wavelength division multiplexed unidirectional transmission medium (which is the situation shown by way of example in this figure), and said fourth support S4 supports send or receive opto-electronic transducer means depending on whether said termination equipment is a send or receive termination equipment for said unidirectional transmission medium which is not wavelength division multiplexed (the former of these situations is that shown by way of example in this figure).

Figure 16:
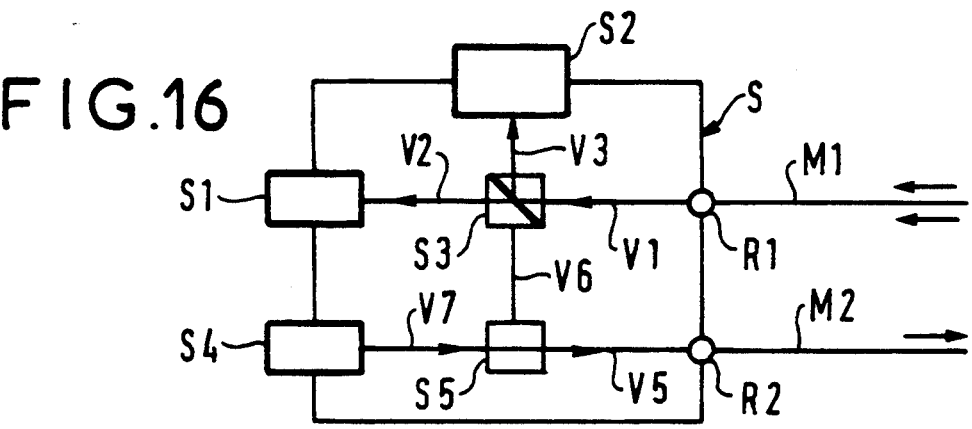

FIG. 16 shows the application of a device of the type shown in FIG. 4 to termination equipment of an optical link comprising two unidirectional optical transmission media M1, M2 of which one (M1) is a wavelength division multiplexed unidirectional transmission medium. In this application:

said wavelength division multiplexed unidirectional transmission medium M1 is connected to said first connection port R1 and the other unidirectional transmission medium M2 is connected to said second connection port R2, said third support S3 supports beam switching means comprising means for splitting beams according to their wavelength from said first channel to said third channel and from said first channel to said second channel or vice versa depending on whether said unidirectional transmission medium assigned to receiving is connected to said first connection port and said unidirectional transmission medium assigned to sending is connected to said second connection port (which is the situation shown by way of example in this figure) or vice versa; in the latter case the beam switching means comprise beam combiner means, said first and second supports S1, S2 respectively support two send opto-electronic transducer means respectively operating at one of said wavelengths or two receive opto-electronic transducer means respectively operating at one of said wavelengths depending on whether said termination equipment is a send or receive termination equipment for said wavelength division multiplexed unidirectional transmission medium M1 (this latter situation is that shown by way of example in this figure), said fourth support S4 supports send or receive opto-electronic transducer means depending on whether said termination equipment is a send termination equipment (this is the situation shown in this figure) or a receive termination equipment for said unidirectional transmission medium M2 which is not wavelength division multiplexed, and said fifth support S5 does not support any component and enables said fifth and seventh channels to be connected together as symbolically shown in the figure.

Figure 17:
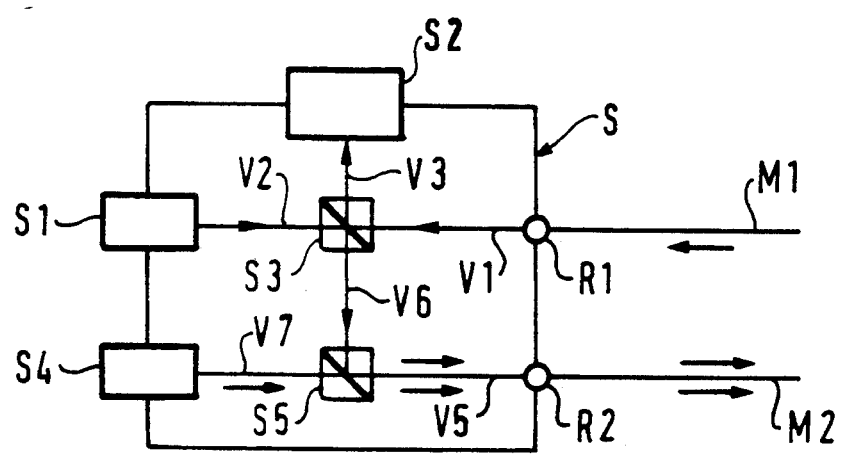

FIG. 17 shows the application of a device of the type shown in FIG. 4 to termination equipment of an optical link comprising two unidirectional optical transmission media M1, M2 of which one (M2) is wavelength division multiplexed. In this application:

said unidirectional transmission medium M1 is connected to said first connection port R1 and the wavelength division multiplexed transmission medium M2 is connected to said second connection port R2, said third support S3 supports beam switching means comprising means for deflecting the beam from said first channel V1 to said third channel V3 or vice versa depending on whether said unidirectional transmission medium assigned to receiving is connected to said first connection port and said transmission medium assigned to sending is connected to said second connection port (which is the situation shown by way of example in this figure) or vice versa and from said second channel to said sixth channel or vice versa depending on whether said unidirectional transmission medium assigned to receiving is connected to said first connection port and said transmission medium assigned to sending is connected to said second connection port (which is the situation shown by way of example in this figure) or vice versa, said fifth support S5 supports beam switching means comprising means for combining beams according to their wavelength from said sixth channel to said fifth channel and from said seventh channel to said fifth channel or vice versa depending on whether said unidirectional transmission medium assigned to receiving is connected to said first connection port and said unidirectional transmission medium assigned to sending is connected to said second connection port (which is the situation shown by way of example in this figure) or vice versa; in this latter case the beam switching means comprise beam splitter means, said first and second supports S1, S2 respectively support send and receive opto-electronic transducer means or vice versa depending on whether the transmission medium assigned to receiving is connected the first connection port and the transmission medium assigned to sending is connected to the second connection port (which is the situation shown by way of example in this figure) or vice versa, and said fourth support S4 supports send or receive opto-electronic transducer means depending on whether said termination equipment is a send termination equipment (which is the situation shown by way of example in this figure) or a receive termination equipment for said wavelength division multiplexed unidirectional transmission medium M2.

The various components mentioned hereinabove: send and receive opto-electronic transducer means and beam switching (splitting, combining or deflecting) means may be conventional means which do not need to be described in detail here. Suffice to say that, depending on the application, the beam splitter or combiner means may comprise a send-receive coupler or a wavelength multiplexer or demultiplexer and the beam deflector means may comprise a mirror, double-sided where necessary.

The opto-electronic transducer means may be coupled to the respective channels by conventional techniques that are not described here.

Lenses may be used, if necessary, to provide on the various channels a parallel-sided beam whose width is appropriate to the use of such transducer means.

The connection ports may be optical connectors or fiber ports.

The channels between the ports and the switching means, between the switching means and the opto-electronic transducer means and between the switching means are in air, for example, or use different types of media constituting optical transmission channels.

Consideration may be given to incorporating a further filter between the beam splitter means and the opto-electronic transducer means.

We claim:

1. Opto-electronic transducer device for optical link termination equipment comprising:
    a first connection port (R1) for said optical link,
    first and second supports (S1, S2) supporting respective first and second opto-electronic transducer means, and
    a third support (S3) supporting a first beam switching means, these components being located in a common structure (S) and disposed relative to each other so as to enable optical transmission between said first connection port and said first beam switching means and between each of said opto-electronic transducer means and said first beam switching means, so defining within said structure first, second and third optical transmission channels (V1, V2, V3), characterized in that it further comprises a second connection port (R2) for said optical link and a fourth support (S4) supporting a third opto-electronic transducer means, these latter two components being also located in said structure (S) and disposed relative to each other and relative to the previous components to enable optical transmission between said third opto-electronic transducer means and said second connection port, so defining within said structure a fourth optical transmission channel (V4).

2. Application of a device according to claim 1 to termination equipment of a bidirectional optical link comprising a single bidirectional transmission medium (E/R) characterized in that:
    said bidirectional transmission medium (E/R) is connected to said first connection port (R1),
    said third support (S3) supports beam switching means comprising send and receive beam splitter means,
    said first and second supports (S1, S2) respectively support send and receive opto-electronic transducer means or vice versa depending on whether said send beam is conveyed by said second transmission channel and said receive beam is conveyed by said third transmission channel or vice versa, and
    said fourth support (S4) does not support any component and said second connection port (R2) is not connected to any optical transmission medium.

3. Application of a device according to claim 1 to termination equipment of a bidirectional optical link comprising two unidirectional transmission media (E, R) respectively assigned to sending and receiving characterized in that:
    one of said unidirectional transmission media (E, R) is connected to said first connection port (R1) and the other to said second connection port (R2),
    said third support (S3) supports beam switching means comprising means for deflecting the beam from the first channel to the third channel or vice versa depending on whether said transmission medium (R) assigned to receiving is connected to the first connection port (R1) and said transmission medium (E) assigned to sending is connected to the second connection port R2 or vice versa,
    said fourth support (S4) supports send or receive opto-electronic transducer means depending on whether said transmission medium (E) assigned to sending is connected to the second connection port (R2) and said transmission medium (R) assigned to receiving is connected to the first connection port (R1) or vice versa, and
    said first or second support supports receive or send opto-electronic transducer means depending on whether said transmission medium (R) assigned to receiving is connected to the first connection port (R1) and said transmission medium (E) assigned to sending is connected to the second connection port (R2) or vice versa, the other of said first and second supports then supporting no component.

4. Application of a device according to claim 1 to termination equipment of an optical link comprising a bidirectional optical transmission medium (E/R) and a unidirectional transmission medium (M) characterized in that:
    said bidirectional optical transmission medium (E/R) is connected to the first connection port (R1),
    said unidirectional optical transmission medium (M) is connected to the second connection port (R2),
    said third support (S3) supports beam switching means comprising send and receive beam splitter or combiner means,
    said first and second supports (S1, S2) respectively support send and receive opto-electronic transducer means or vice versa depending on whether said send beam is conveyed by said second transmission channel and said receive beam is conveyed by said third transmission channel or vice versa, and
    said fourth support (S4) supports send or receive opto-electronic transducer means depending on whether said termination equipment is a send or receive termination equipment for said unidirectional optical transmission medium (M).

5. Application of a device according to claim 1 to termination equipment of an optical link comprising two unidirectional optical transmission media (M1, M2) of which one (M1) is a wavelength division multiplexed unidirectional transmission medium characterized in that:
    said wavelength division multiplexed unidirectional transmission medium (M1) is connected to said first connection port (R1) and the other unidirectional transmission medium (M2) is connected to said second connection port (R2),
    said third support (S3) supports beam switching means comprising means for splitting or combining beams according to their wavelength,
    said first and second supports (S1, S2) respectively support two send opto-electronic transducer means respectively operating at one of said wavelengths or two receive opto-electronic transducer means respectively operating at one of said wavelengths depending on whether said termination equipment is a send or receive termination equipment for said wavelength division multiplexed unidirectional transmission medium (M1), and said fourth support (S4) supports send or receive opto-electronic transducer means depending on whether said termination equipment is a send or receive termination equipment for said unidirectional transmission medium (M2) which is not wavelength division multiplexed.

6. Opto-electronic transducer device for optical link termination equipment comprising:

a first connection port (R1) for said optical link, first and second supports (S1, S2) adapted to supporting respective first and second opto-electronic transducer means, and a third support (S3) supporting a first beam switching means, these components being located in a common structure (S) and disposed relative to each other so as to enable optical transmission between said first connection port and said first beam switching means and between each of said opto-electronic transducer means and said first beam switching means, so defining within said structure first, second and third optical transmission channels (V1, V2, V3), characterized in that it further comprises a second connection port (R2) for said optical link and a fifth support (S5) supporting a second beam switching means, these latter two components being also located in said structure (S) and disposed relative to each other and relative to the previous components to enable optical transmission between said second beam switching means and said second connection port and between said second beam switching means and said first beam switching means, so defining within said structure fifth and sixth optical transmission channels (V5, V6).

7. Device according to claim 6 characterized in that it further comprises a fourth support (S4) adapted to support third opto-electronic transducer means also located in said structure (S) and disposed relative to the previous components to enable optical transmission between said second beam switching means and said third opto-electronic transducer means, so defining within said structure a seventh optical transmission channel (V7).

8. Application of a device according to claim 6 to termination equipment of a bidirectional optical link comprising a single bidirectional transmission medium (E/R) characterized in that:

said bidirectional transmission medium (E/R) is connected to said first connection port (R1), said third support (S3) supports beam switching means comprising send and receive beam splitter means, said first and second supports (S1, S2) respectively support send and receive opto-electronic transducer means or vice versa depending on whether said send beam is conveyed by said second transmission channel and said receive beam is conveyed by said third transmission channel or vice versa, and said fifth support (S5) does not support any component and said second connection port (R2) is not connected to any optical transmission medium.

9. Application of a device according to claim 7 to termination equipment of a bidirectional optical link comprising a single bidirectional transmission medium (E/R) characterized in that:

said bidirectional transmission medium (E/R) is connected to said first connection port (R1), said third support (S3) supports beams switching means comprising send and receive beam splitter means, said first and second supports (S1, S2) respectively support send and receive opto-electronic transducer means or vice versa depending on whether said send beam is conveyed by said second transmission channel and said receive beam is conveyed by said third transmission channel or vice versa, and said fourth support (S4) and said fifth support (S5) do not support any component and said second connection port (R2) is not connected to any optical transmission medium.

10. Application of a device according to claim 6 to termination equipment of a bidirectional optical link comprising two unidirectional transmission media (E, R) respectively assigned to sending and receiving characterized in that:

one of said unidirectional transmission media (E, R) is connected to said first connection port (R1) and the other said second connection port (R2), said third support (S3) supports beam switching means comprising means for deflecting the beam from said first channel (V1) to said third channel (V3) or vice versa depending on whether the unidirectional transmission medium assigned to receiving is connected to the said first connection port and said unidirectional medium assigned to sending is connected to said second connection port or vice versa and from said second channel to said sixth channel or vice versa depending on whether said unidirectional transmission medium assigned to receiving is connected to said first connection port and said unidirectional transmission medium assigned to sending is connected to said second connection port or vice versa, said fifth support (S5) supports beam switching means comprising means for deflecting the beam from said sixth channel to said fifth channel or vice versa depending on whether said unidirectional transmission medium assigned to receiving is connected to said first connection port and said unidirectional transmission medium assigned to sending is connected to said second connection port or vice versa, and said first and second supports (S1, S2) respectively support send and receive opto-electronic transducer means or vice versa depending on whether the unidirectional transmission medium assigned to sending is connected to the second connection port and the unidirectional transmission medium assigned to receiving is connected to the first connection port or vice versa.

11. Application of a device according to claim 7 to termination equipment of a bidirectional optical link comprising two unidirectional transmission media (E, R) respectively assigned to sending and receiving characterized in that:

one of said unidirectional transmission media (E, R) is connected to said first connection port (R1) and the other to said second connection port (R2), said third support (S3) supports beam switching means comprising means for deflecting the beam from the first channel to the third channel or vice versa depending on whether said transmission medium assigned to receiving is connected to said first connection port and said transmission medium assigned to sending is connected to said second connection port or vice versa, said fourth support (S4) supports send or receive opto-electronic transducer means depending on whether said transmission medium (E) assigned to sending is connected to the second connection port (R2) and said transmission medium (R) assigned to receiving is connected to said first connection port (R1) or vice versa, one of said first and second supports (S1-S2) supports receive or send opto-electronic transducer means depending on whether said transmission medium (R) assigned to receiving is connected to the first connection port (R1) and said transmission medium (E) assigned to sending is connected to the second connection port (R2) or vice versa, the other of said first and second supports then not supporting any component, and said fifth support does not support any component and enables said fifth and seventh channels to be connected together.

12. Application of a device according to claim 7 to termination equipment of a bidirectional optical link comprising two unidirectional transmission media (E, R) respectively assigned to sending and receiving characterized in that:

one of said unidirectional transmission media (E, R) is connected to said first connection port (R1) and the other to said second connection port (R2), said third support (S3) supports beam switching means comprising means for deflecting the beam from said first channel (V1) to said third channel (V3) or vice versa depending on whether said unidirectional transmission medium assigned to receiving is connected to said first connection port (R1) and said unidirectional transmission medium assigned to sending is connected to said second connection port (R2) or vice versa and from said second channel to said sixth channel or vice versa depending on whether said unidirectional transmission medium assigned to receiving is connected to said first connection port and said unidirectional transmission medium assigned to sending is connected to said second connection port or vice versa, said fifth support (S5) supports beam switching means comprising means for deflecting the beam from said sixth channel to said fifth channel or vice versa depending on whether said unidirectional transmission medium assigned to receiving is connected to said first connection port and said unidirectional transmission medium assigned to sending is connected to said second connection port or vice versa, said first and second supports (S1, S2) respectively support send and receive opto-electronic transducer means or vice versa depending on whether the transmission medium assigned to receiving is connected to the first connection port and the transmission medium assigned to sending is connected to the second connection port or vice versa, and said fourth support does not support any component.

13. Application of a device according to claim 7 to termination equipment of an optical link comprising a bidirectional optical transmission medium (E/R) and a unidirectional optical transmission medium (M) characterized in that:

said bidirectional optical transmission medium (E/R) is connected to the first connection port (R1), said unidirectional optical transmission medium (M) is connected to the second connection port (R2), said third support (S3) supports beam switching means comprising send and receive beam splitter means, said first and second supports (S1, S2) respectively support send and receive opto-electronic transducer means or vice versa depending on whether said send beam is conveyed by said second transmission channel and said receive beam is conveyed by said third transmission channel or vice versa, said fourth support (S4) supports send or receive opto-electronic transducer means depending on whether the termination equipment is a send or receive termination equipment for said unidirectional transmission medium (M), and said fifth support (S5) does not support any component and enables said fifth and seventh channels to be connected together.

14. Application of a device according to claim 7 to termination equipment of an optical link comprising two unidirectional optical transmission media (M1, M2) of which one (M1) is a wavelength division multiplexed unidirectional transmission medium characterized in that:

said wavelength division multiplexed unidirectional transmission medium (M1) is connected to said first connection port (R1) and the other unidirectional transmission medium (M2) is connected to said second connection port (R2), said third support (S3) supports beam switching means comprising means for splitting or combining beams according to their wavelength, said first and second supports (S1, S2) respectively support two send opto-electronic transducer means respectively operating at one of said wavelengths or two receive opto-electronic transducer means respectively operating at one of said wavelengths depending on whether said termination equipment is a send or receive termination equipment for said wavelength division multiplexed unidirectional transmission medium (M1), said fourth support (S4) supports send or receive opto-electronic transducer means depending on whether said termination equipment is a send or receive termination equipment for said unidirectional transmission medium (M2) which is not wavelength division multiplexed, and said fifth support (S5) does not support any component and enables said fifth and seventh channels to be connected together.

15. Application of a device according to claim 7 to termination equipment of an optical link comprising two unidirectional optical transmission media (M1, M2) of which one (M2) is wavelength division multiplexed characterized in that:

said unidirectional transmission medium (M1) is connected to said first connection port (R1) and the wavelength division multiplexed transmission medium (M2) is connected to said second connection port (R2), said fifth support (S5) supports beam switching means comprising means for splitting or combining beams according to their wavelength, said fourth support (S4) supports send or receive opto-electronic transducer means operating at one of said wavelengths depending on whether said termination equipment is a send or receive termination equipment for said wavelength division multiplexed unidirectional transmission medium (M2), said first and second supports (S1, S2) respectively support receive or send opto-electronic transducer means depending on whether said transmission medium (M1), which is not wavelength division multiplexed, assigned to receiving is connected to said first connection port (R1) and said unidirectional transmission medium (M2) assigned to sending is connected to said second connection port (R2) or vice versa, and said third support (S3) supports beam switching means comprising means for deflecting the beam from said first channel (V1) to said third channel (V3) or vice versa depending one whether said unidirectional transmission medium assigned to receiving is connected to said first connection port (R1) and said unidirectional transmission medium assigned to sending is connected to said second connection port (R2) or vice versa and from said second channel (V2) to said sixth channel (V6) or vice versa depending on whether said unidirectional transmission medium assigned to receiving is connected to said first connection port and said transmission medium assigned to sending is connected to said second connection port or vice versa.

* * * * *